United States Patent [19]
Cheng

[11] Patent Number: 6,094,363
[45] Date of Patent: Jul. 25, 2000

[54] UNINTERRUPTIBLE POWER SUPPLY WITH AC SINE WAVE OUTPUT AND ENERGY RECYCLE FUNCTION

[75] Inventor: Shui-Chu Cheng, Taipei, Taiwan

[73] Assignee: Phoenixtec Power Co., Ltd., Taipei, Taiwan

[21] Appl. No.: 09/217,019

[22] Filed: Dec. 21, 1998

[51] Int. Cl.[7] .................................................. H02M 3/335
[52] U.S. Cl. ................................ 363/26; 363/41; 307/64
[58] Field of Search .................................. 363/16, 17, 34, 363/24, 25, 26, 40, 41; 307/64, 66, 45

[56] References Cited

U.S. PATENT DOCUMENTS 5,241,217 8/1993 Severinsky .................................. 307/64
5,625,539 4/1997 Nakata et al. .............................. 363/17

*Primary Examiner*—Jessica Han
*Attorney, Agent, or Firm*—Jackson Walker L.L.P.

[57] ABSTRACT

An uninterruptible power supply with sine wave AC output and energy recycle function is disclosed. The uninterruptible power supply makes use of a DC/DC converter to boost and convert the DC voltage of a battery set to a full-wave rectified shaped DC voltage. A microcontroller is provided to generate a full-wave rectified shaped DC reference signal to force the DC/DC converter to follow the reference signal for adjusting its output to a full-wave rectified shaped DC voltage. The full-wave rectified shaped DC voltage is converted by an inverter to a sine wave AC voltage for providing uninterruptible power. An energy recycle charger is further provided to recycle redundant energy to the battery set.

3 Claims, 3 Drawing Sheets

6,094,363

UNINTERRUPTIBLE POWER SUPPLY WITH AC SINE WAVE OUTPUT AND ENERGY RECYCLE FUNCTION

BACKGROUND OF THE INVENTION

1. Field of the Invention

The present invention relates an uninterruptible power supply, and more particularly, to an uninterruptible power supply which provides an sine wave AC output and has an energy recycle function to recharge the internal batteries.

2. Description of Related Art

The uninterruptible power supply (hereinafter abbreviated as UPS) refers to an AC power supply which is switched on to provide AC power at the instant that utility power drops below specified limits or is shut down, wherein an off-line UPS simply filters and passes the utility power to a load when utility power is normal. FIG. 4 shows a structure of an off-line UPS. When the utility power is abnormal (such as the utility power voltage too high or too low), the UPS converts the voltage of its battery (41) to a relatively high DC voltage by a DC/DC converter (42). The relatively high DC voltage is then converted to an AC voltage by alternatively switching on two pairs of switches in the inverter (43). This AC voltage is actually a square-wave AC voltage, as shown at the output of the DC/DC converter (42), which may damage inductive loads such as transformers and motors if applied thereto. Therefore, a higher grade UPS usually has a sine wave AC voltage output. However, it requires very complicated circuitry for the UPS to provide a sine wave AC voltage output and more energy is consumed in the circuit. Thus, there is a need for the above UPS to be improved.

SUMMARY OF THE INVENTON

The objective of the present invention is to provide an uninterruptible power supply having an sine wave AC output and an energy recycle function with simple circuit structure thereby providing high quality and high efficiency uninterruptible power.

To achieve the objective, the uninterruptible power supply makes use of a DC/DC converter to boost and convert the DC voltage of a battery set to a full-wave rectified shaped DC voltage. A microcontroller is provided to generate a full-wave rectified shaped DC reference signal to force the DC/DC converter to follow the reference signal to adjust its output to a full-wave rectified shaped DC voltage. The full-wave rectified shaped DC voltage is converted by an inverter to a sine wave AC voltage to provide uninterrupted power. An energy recycle charger is further provided to recycle redundant energy to the battery set.

Other objectives, advantages, and novel features of the invention will become more apparent from the following detailed description when taken in conjunction with the accompanying drawings.

DETAILED DESCRIPTION OF PREFERRED EMBODIMENT

Figure 1:
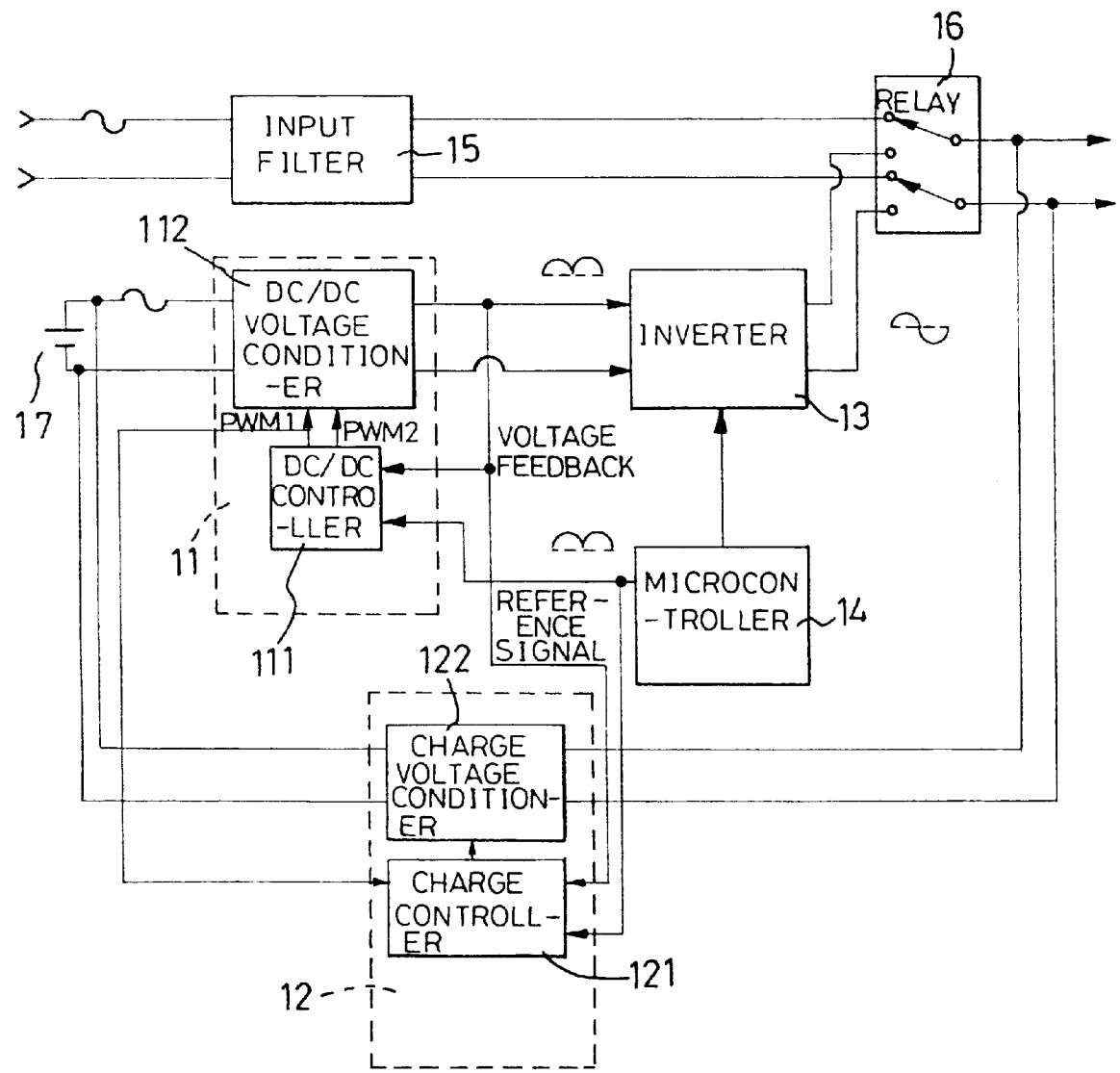
FIG. 1 is a circuit block diagram of the UPS in accordance with the present invention.
Figure 4:
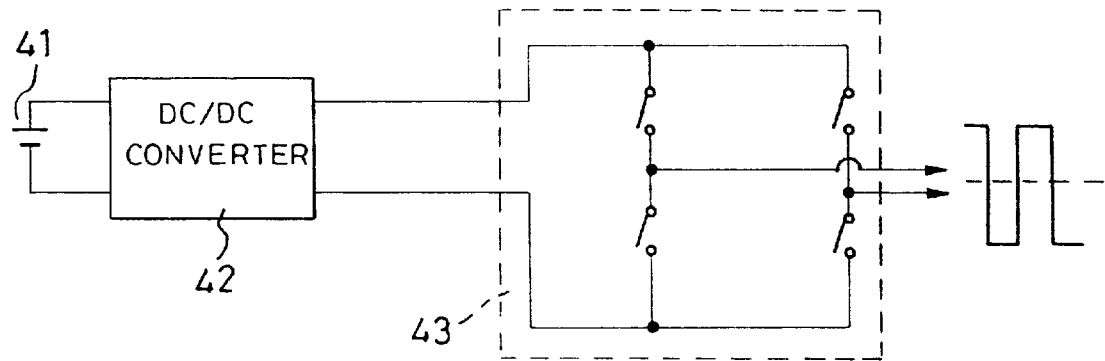
FIG. 4 shows the structure of a conventional UPS.

Referring to FIG. 1, the UPS in accordance with the present invention includes a DC/DC converter (11), an energy recycle charger (12), an inverter switch unit (13), a microcontroller (14), an input filter (15), a relay (16) and a battery set (17). Utility power is filtered by the input filter (15) to remove the electromagnetic interference from the electrical power supplied via the relay (16) when the utility power is normal. The relay (16) switches the source of electrical power if the supply of the utility power is outside of normal limits.

In order to provide suitable electrical power when the utility power is abnormal, the DC/DC boost and converter (11) has to convert the voltage of the battery set (17) to a full-wave rectified shaped DC voltage as shown at the output thereof. By applying this full-wave rectified shaped DC voltage to the inverter (13), a sine wave AC voltage can be obtained at the output of the inverter (13) without using very complicated circuitry. To achieve this, the microcontroller (14) has to send a full-wave rectified shaped DC reference signal, as shown at the output thereof, to the DC/DC converter (11). Accordingly, the DC/DC converter (11) is forced to follow the reference signal to adjust its output to a full-wave rectified shaped DC voltage to be applied to the inverter (13). The DC/DC converter (11) consists of a DC/DC controller (111) and a DC/DC voltage conditioner (112). The DC/DC controller (111) is preferably a regulating pulse width modulator (PWM) which generates two pulse width modulation signals (PWM1, PWM2) in response to the reference signal from the microcontroller (14) and the voltage feedback from the DC/DC voltage conditioner (112), thereby forcing the DC/DC transformer and switch unit (112) to generate the required full-wave rectified shaped DC voltage.

Figure 2:
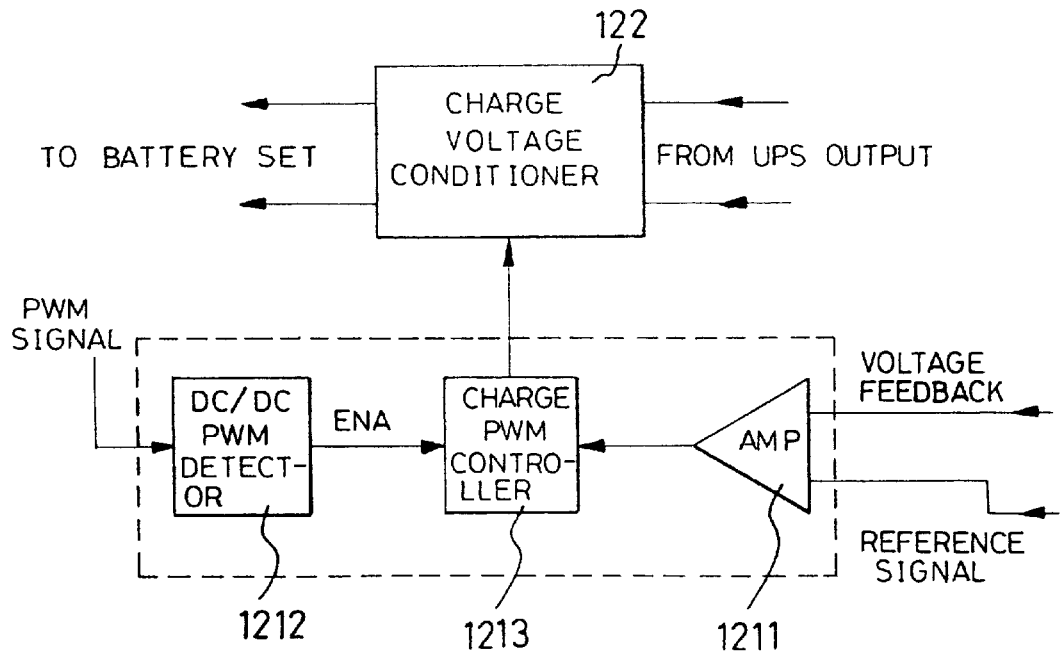
FIG. 2 is a circuit block diagram of the energy recycle charger of the UPS in accordance with the present invention.

In order to keep the UPS charged and eliminate the redundant energy at the output thereof, the energy recycle charger (12) is provided. When the supply of the utility power is normal, the energy recycle charger (12) taps and converts the AC voltage at the output terminal to charge the battery set (17). When the supply of the utility power is abnormal and the UPS is supplying power by converting the energy from the battery set (17), the energy recycle charger (12) is used to recycle energy. The energy recycle operation is depicted in FIG. 1. If the UPS is used to supply power to an inductive load, there will be a phase difference between the output voltage and the output current so that the output current may flow back to the output of the DC/DC converter (11) thereby increasing the voltage level at the output of the DC/DC converter (11). At that moment, even if the DC/DC controller (111) does not output PWM signals, the voltage at the output of the DC/DC converter (11) is increased such that it does not look like a full-wave rectified shaped DC voltage because of such redundant energy. Rather it looks like the sum of a full-wave rectified shaped DC voltage and a DC voltage. This DC segment is referred to as the "redundant energy" used to charge the battery. Therefore, the energy recycle charger (12) must recycle the redundant energy to the battery set (17) to further provide power to the DC/DC converter (11) thereby enhancing the overall performance of the UPS. The energy recycle charger (12) consists of a charge controller (121) and a charge voltage conditioner unit (122). The charge controller (121) controls the charge voltage conditioner unit (122) in response to the reference signal from the microcontroller (14), the voltage feedback from the DC/DC voltage conditioner (112) and the PWM signal (PWM1) from the DC/DC controller (111) to recycle the redundant energy to the battery set (17). However, the energy recycle operation is not always active. In detail, the energy recycle is active when the following two conditions are satisfied: (a) energy flows back thereby increasing the voltage level at the output of the DC/DC converter (11), and (b) the DC/DC converter (11) does not generate PWM signals. In order to detect the two conditions, the charge controller (121) is provided with an error amplifier (1211) and a DC/DC PWM detector (1212) as shown in FIG. 2. The error amplifier (1211) compares the output voltage of the DC/DC converter (11) with the reference signal of the microprocessor (14). When the output voltage of the DC/DC converter (11) is abnormally increased, the output voltage of the error amplifier (1211) is enlarged to activate a charge PWM controller (1213) to initiate the energy recycle operation. The DC/DC PWM detector (1212) is used to detect the existence of the PWM signal from the DC/DC converter (11). If there is a PWM signal present, the DC/DC converter is activated. At this moment, the DC/DC PWM detector (1212) generates an enable signal (ENA) to activate the charge PWM controller (1213) to terminate the charge operation of the charge voltage conditioner unit (122). If there is no PWM signal present and the output voltage of the error amplifier (1211) is increased, energy is flowing back to the DC/DC converter (11). At this moment, the enable signal (ENA) enables the charge PWM controller (1213) to activate the charge switch and transformer unit (122) to recycle the redundant energy to the battery set (17).

Figure 3:
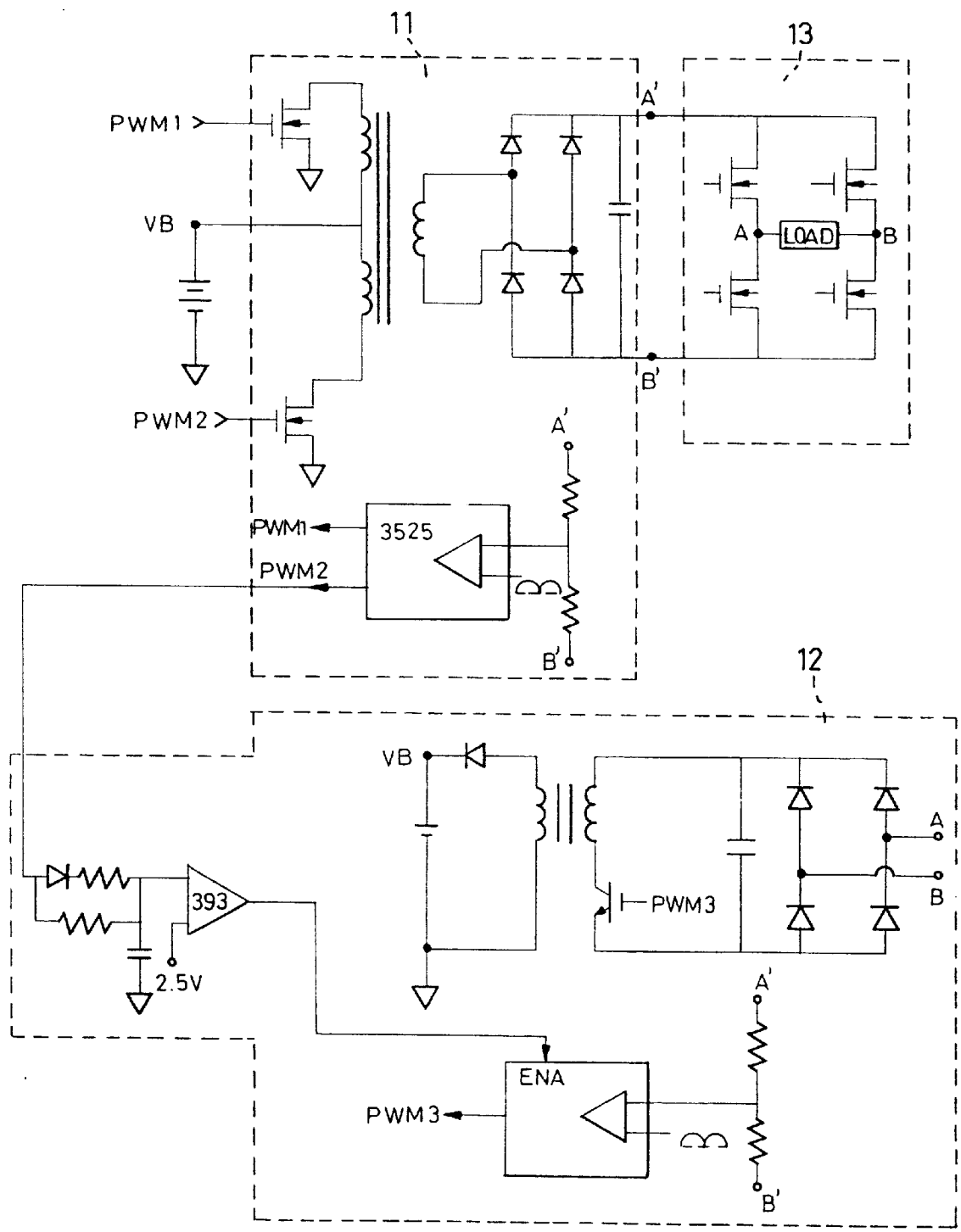
FIG. 3 is a detailed circuit diagram of the UPS in accordance with the present invention.

The microcontroller (14), input filter (15), relay (16), and battery set (17) are all well known electronic components. The inverter (13) is preferably implemented by a plurality of switching transistors. The DC/DC converter (11) can be any circuit capable of converting a DC voltage to another DC voltage, which may be implemented by a flyback or push-pull circuit structure. The energy recycle charger (12) can be any circuit capable of converting an AC voltage to a DC voltage, which may be implemented by a flyback or buck circuit structure. FIG. 3 gives an example of a circuit diagram for the UPS in accordance with the present invention. As shown in FIG. 3, the inverter (13) is formed by four MOS transistors respectively controlled by the microcontroller (14) whereby two MOS transistor pairs are alternatively switched on to convert the full-wave rectified shaped DC voltage to a sine wave AC voltage. The DC/DC converter (11) is implemented by a push-pull circuit structure and the energy recycle charger (12) is implemented by a flyback circuit structure.

Although the present invention has been explained in relation to its preferred embodiment, it is to be understood that many other possible modifications and variations can be made without departing from the spirit and scope of the invention as hereinafter claimed.

What is claimed is:

1. An interruptible power supply for providing uninterruptible power when utility power is abnormal, said uninterruptible power supply comprising:

a battery set for providing a DC voltage;

a DC/DC converter comprising;
      a DC/DC voltage conditioner for boosting and converting said DC voltage to a boosted and full-wave rectified shaped DC voltage; and
      a DC/DC controller for generating pulse width modulation (PWM) signals to control said DC/DC voltage conditioner in response to a feedback signal indicative of said boosted and full-wave rectified shaped DC voltage and a full-wave rectified shaped DC reference signal;

an inverter for converting said full-wave rectified shaped DC voltage to a sine wave AC voltage;

a microcontroller for generating said full-wave rectified shaped DC reference signal to said DC/DC controller and for controlling said inverter;

a relay for selectively outputting said utility power and said uninterruptible power; and an energy recycle charger for charging said battery set by said utility power and for recycling redundant energy of said uninterruptible power to said battery set, said energy recycle charger being controlled by said feedback signal indicative of said boosted and full-wave rectified shaped DC voltage, said full-wave rectified shaped DC reference signal and said PWM signals.

2. The uninterruptible power supply as claimed in claim 1, wherein said energy recycle charger comprises:

a charge voltage conditioner for selectively charging said battery set by said utility power or recycling said redundant energy of said uninterruptible power when said feedback signal indicative of said boosted and full-wave rectified shaped DC voltages increases abnormally and said PWM signals are not present.

3. The uninterruptible power supply as claimed in claim 2, wherein said charge controller comprises:

an error amplifier for comparing said feedback signal indicative of said boosted and full-wave rectified shaped DC voltage with said full-wave rectified shaped DC reference signal;

a DC/DC PWM detector for detecting said PWM signals; and a charge PWM controller for actuating said charge voltage conditioner, said charge PWM controller being controlled by said error amplifier and said DC/DC PWM detector.

* * * * *